(12) United States Patent
Dorward

(10) Patent No.: US 12,093,974 B2
(45) Date of Patent: *Sep. 17, 2024

(54) REVIEW ENGINE WITH BLOCKCHAIN-BASED VERIFICATION

(71) Applicant: Lucid Ratings, Inc., Saint Louis, MO (US)

(72) Inventor: Ian Gordon Ashley Dorward, Chesterfield, MO (US)

(73) Assignee: Lucid Ratings, Inc., Saint Louis, MO (US)

( * ) Notice: Subject to any disclaimer, the term of this patent is extended or adjusted under 35 U.S.C. 154(b) by 262 days.

This patent is subject to a terminal disclaimer.

(21) Appl. No.: 17/515,393

(22) Filed: Oct. 29, 2021

(65) Prior Publication Data

US 2022/0138791 A1 May 5, 2022

Related U.S. Application Data

(60) Provisional application No. 63/107,856, filed on Oct. 30, 2020.

(51) Int. Cl.
*G06Q 30/0217* (2023.01)
*G06F 9/455* (2018.01)
(Continued)

(52) U.S. Cl.
CPC ..... *G06Q 30/0217* (2013.01); *G06Q 30/0282* (2013.01); *H04L 9/3213* (2013.01);
(Continued)

(58) Field of Classification Search
CPC .............. G06Q 30/0282; H04L 9/3213; H04L 9/3236; H04L 9/50; H04L 63/12;
(Continued)

(56) References Cited

U.S. PATENT DOCUMENTS

| | | | |
|---|---|---|---|
| 9,760,547 B1* | 9/2017 | Brougher | G06Q 10/063 |
| 2004/0068477 A1* | 4/2004 | Gilmour | G06F 16/9535 |
| 2007/0192130 A1* | 8/2007 | Sandhu | G06Q 10/1053 |
| | | | 705/347 |

(Continued)

FOREIGN PATENT DOCUMENTS

WO    WO-2018201009 A1 *  11/2018  ............. G06F 21/00

OTHER PUBLICATIONS

K. Salah, A. Alfalasi, M. Al. "A Blockchain-based System for Online Consumer Reviews." Nov. 14, 2023 at 13:45:54 UTC from IEEE Xplore. Restrictions apply.978-1-7281-1878-9/19/$31.00 © 2019 IEEE. 2019 IEEE INFOCOM WKSHPS: CryBlock 2019: Cryptocurrencies and Blockchains for Distributed Systems. pp. 853-858.*

*Primary Examiner* — Zi Ye
*Assistant Examiner* — Berhanu Shitayewoldetadik
(74) *Attorney, Agent, or Firm* — Cognition IP, P.C.; Edward Steakley

(57) ABSTRACT

The systems and methods described herein relate to providing review content which is verifiable in a public blockchain network. The system receives an identity verification for a user of a review engine, then assigns a unique pseudonymous identity to the user based on the identity verification. Next, the system receives an identity verification for a provider on the review engine, and generates an authentication token unique to the provider to be displayed on a user client device associated with the user of the review engine. In response to the user capturing the authentication token via the client device, the system generates a review-in-progress to be displayed on the client device. Upon receiving a completed review from the user, the system records hashed data associated with the review into a transaction record on a public blockchain network, such that the transaction record can be publicly audited on the public blockchain network.

20 Claims, 11 Drawing Sheets

(51) Int. Cl.
*G06F 15/16* (2006.01)
*G06Q 30/0282* (2023.01)
*H04L 9/00* (2022.01)
*H04L 9/32* (2006.01)
*H04L 9/40* (2022.01)
*H04L 15/16* (2006.01)
*H04L 29/06* (2006.01)
*H04L 29/08* (2006.01)

(52) U.S. Cl.
CPC .............. *H04L 9/3236* (2013.01); *H04L 9/50* (2022.05); *H04L 63/12* (2013.01); *H04L 9/00* (2013.01)

(58) Field of Classification Search
CPC ..... H04L 9/00; H04L 2209/42; H04L 9/3239; H04L 63/0407; H04L 63/0807; H04W 12/77
USPC .......................................................... 713/168
See application file for complete search history.

(56) References Cited

U.S. PATENT DOCUMENTS

| | | | |
|---|---|---|---|
| 2009/0165128 A1* | 6/2009 | McNally | G06Q 30/0273 726/21 |
| 2014/0114866 A1* | 4/2014 | Abhyanker | G06Q 10/10 705/307 |
| 2015/0010895 A1* | 1/2015 | Hastings | G09B 7/00 434/362 |
| 2015/0178796 A1* | 6/2015 | Lin | G06Q 30/0282 705/347 |
| 2015/0264093 A1* | 9/2015 | Madisch | G06Q 10/101 715/753 |
| 2016/0140637 A1* | 5/2016 | Szabo | G06Q 30/0282 705/14.54 |
| 2016/0232204 A1* | 8/2016 | Zholudev | G06F 40/117 |
| 2016/0267150 A1* | 9/2016 | Gubau i Forné | G06F 16/245 |
| 2018/0077129 A1* | 3/2018 | Baum | H04L 63/123 |
| 2018/0300304 A1* | 10/2018 | Mullins | G06Q 10/10 |
| 2019/0222567 A1* | 7/2019 | Caldera | H04L 63/0876 |
| 2019/0349371 A1* | 11/2019 | Smith | G06F 21/31 |
| 2019/0349372 A1* | 11/2019 | Smith | H04L 63/0884 |
| 2019/0354725 A1* | 11/2019 | Lowagie | G06F 21/602 |
| 2019/0370468 A1* | 12/2019 | Soby | G06F 21/57 |
| 2020/0053081 A1* | 2/2020 | Park | H04L 9/3239 |
| 2021/0201336 A1* | 7/2021 | Mallett | G06F 3/011 |
| 2021/0357447 A1* | 11/2021 | McKenzie | G11B 27/34 |
| 2021/0398095 A1* | 12/2021 | Mallett | G06Q 50/01 |
| 2022/0101316 A1* | 3/2022 | Cramer | G06Q 20/3825 |
| 2023/0262034 A1* | 8/2023 | Mitter | G06F 21/6218 713/150 |

* cited by examiner

220

```
┌─────────────────────────────────────────────────────────────┐
│ Hash one or more of the pseudonymous identity of the user,  │── 222
│ verified identity of the provider, and contents of the completed │
│ review to generate the hashed data                          │
└─────────────────────────────────────────────────────────────┘
                              │
                              ▼
┌─────────────────────────────────────────────────────────────┐
│ Provide the hashed data to users of the review engine such that │── 224
│ they can check the hashed data against the transaction record on │
│ the public blockchain network to verify the contents have not been │
│ altered                                                     │
└─────────────────────────────────────────────────────────────┘
```

Leave a review for Dr. Daniel Smith
Please rate the following questions. You can click the "Not applicable" option up to 5 times during the whole review.

Communication

This doctor gave clear explanations using words I could understand.
○ Strongly disagree  ● Disagree  ○ Neither agree nor disagree  ○ Agree  ○ Strongly agree  ☐ N/A This doctor answered all my questions.
○ Strongly disagree  ○ Disagree  ○ Neither agree nor disagree  ● Agree  ○ Strongly agree  ☐ N/A This doctor explained the plan of treatment.
○ Strongly disagree  ○ Disagree  ○ Neither agree nor disagree  ○ Agree  ● Strongly agree  ☐ N/A Discussion of my diagnosis was
○ Not informative  ○ Somewhat informative  ○ Neutral  ● Informative  ○ Very informative  ☐ N/A Instruction about future follow-up care was
○ Not informative  ○ Somewhat informative  ○ Neutral  ○ Informative  ○ Very informative  ☑ N/A You can't choose "Not applicable" more than 5 times. Please select other options.

This doctor gave me alternative and allowed me to participate in.
○ Strongly disagree  ○ Disagree  ● Neither agree nor disagree  ○ Agree  ○ Strongly agree  ☐ N/A This doctor fully informed me of the risks associated with my treatment.
○ Strongly disagree  ○ Disagree  ○ Neither agree nor disagree  ● Agree  ○ Strongly agree  ☐ N/A Please provide further details about your experience relating to this doctor's communication.
> Lorem ipsum dolor sit amet, consectetur adipiscing elit, sed do eiusmod tempor.

[Next] [Cancel]

Figure 4D

REVIEW ENGINE WITH BLOCKCHAIN-BASED VERIFICATION

CROSS-REFERENCE TO RELATED APPLICATIONS

This application claims the benefit of U.S. Provisional Application No. 63/107,856, filed Oct. 30, 2020, which is hereby incorporated by reference in its entirety.

FIELD OF THE INVENTION

The present invention relates generally to review systems, and more particularly, to systems and methods for providing review content which is verifiable in a public blockchain network.

BACKGROUND

Web sites and services which offer users the ability to contribute reviews of various people, businesses, products, or services, and access others' reviews of same, are quite popular and fulfill a needed role. Two of the main problems review sites and services face is first, accountability of reviewers, and second, protection of user identities. That is, first, there is often no mechanism by which reviewers can be held accountable for being who they claim to be, i.e., a person who has legitimately entered into a transaction with, used a product of, or otherwise has had some substantive relationship with a provider entity, organization, or business. Second, at least some anonymity of reviewers is often seen as important in order to protect these reviewers and their identities in the public sphere, but anonymity increases the likelihood of reviewers posting low quality reviews such as, e.g., personal grudges and attempts to sabotage or impugn individuals or businesses for reasons other than the quality of their products or services.

Related to both of these problems is the potential for providers (i.e., those individuals or businesses who are being reviewed or whose products are being reviewed) to claim that some reviews are inauthentic when they are authentic, and the potential for review sites or reviewers to modify or otherwise tamper with reviews. Often, the mere possibility or appearance of these concerns can be enough for users to lose trust in a particular review site, whether they are actually happening or not. Even if review sites may not be modifying or tampering with reviews, there is still the possibility of government censorship, hacking attempts, and other issues.

While in some cases the provable nature of a reviewer's identity can assist in proving the authenticity of a review, this provability also could carry with it the risks of violating the privacy of the reviewer. Especially within the field of healthcare in the United States, the Health Insurance Portability and Accountability Act of 1996 ("HIPAA") outlined several categories of Protected Health Information ("PHI") and prescribed severe penalties for any party that would violate the privacy of patients by divulging PHI. Existing online review systems often allow public visibility of the user via linkage with a username or email address that itself constitutes PHI; thus, the provider being reviewed runs the risk of violating HIPAA regulations by publicly rebutting or otherwise interacting with a given review. Similar issues arise with the general privacy protections enumerated in the General Data Protection Regulation ("GDPR") in Europe, which shares commonalities with privacy acts that have passed or will likely be passed in California and other states within the United States.

Thus, there is a need in the field of review systems to create new and useful systems and methods for providing review content which is verifiable in a public blockchain network. The source of the problem, as discovered by the inventors, is a lack of digital identity certification, verified interactions between users and providers (or their products/services), and review content which is guaranteed to be free of censorship or tampering. Further, there is a need for a de-identified or pseudonymous handling of user/reviewer identity such that the user does not divulge their own private details and the provider can interact with reviews without violating the privacy rights of the user.

SUMMARY

The invention overcomes the existing problems by providing review content which is verifiable in a public blockchain network. The system of verification involves three primary input components. One of the components is an identity verification for a user of a review engine; the system assigns a unique pseudonymous identity to the user based on the identity verification. The pseudonymous identity of the user is important to protect user privacy, and to allow providers to interact with reviews without revealing the identity of users to those providers or otherwise revealing any sensitive information about those users (such as, e.g., Protected Health Information within a medical context). The second component is an identity verification for a provider within the review engine, which allows for the generation of an authentication token to be displayed for a user client device. A third component involves the capture of that authentication token by the user, which certifies the interaction with the provider's product or service and generates and displays a review-in-progress. The capture of the authentication token and the user identity verification can occur in any order, but both are required in order to finalize the verification. Finally, the system then receives a completed review from the user client device, and records hashed data associated with the completed review into a transaction record on a public blockchain network. The hashing of the data allows for confirmation that the input data (i.e., at least the user, the provider, and the review contents) have not changed from their original form, yet prevents back-solving from the hash output to find the original input data. Thus, the identity elements and the review contents can be siloed in a protected environment while still allowing for a public audit which ensures that their content has not been altered.

In some embodiments, the system hashes one or more of: the pseudonymous identity of the user, verified identity of the provider, and contents of the completed review to generate the hashed data.

In some embodiments, the system provides the hashed data to users of the review engine such that they can check the hashed data against the transaction record on the public blockchain network to verify the contents have not been altered.

In some embodiments, the system publishes the completed review from the user such that it is accessible to users of the review engine via a user interface. In some embodiments, previously completed reviews are published and accessible via the user interface as well.

In some embodiments, the system allows the provider to interact with a review by providing a response to its numerical rating or narrative review comments; this might constitute thanking reviewers for their time, or it might constitute a counterpoint or a rebuttal to the review. In any case, the pseudonymization of the user enables the provider to interact with the review without confirming or exposing the user's private details.

In some embodiments, the review engine may be utilized to provide a healthcare review platform, such that patients may review, rate, and evaluate their doctors and/or the overall patient experience. Doctors provide verification that those filling out reviews were in fact their patients and an interaction took place, and blockchain-based verification and auditability are provided. In other embodiments, the review engine may be contemplated to be utilized for a variety of other purposes. Some examples may include, e.g., systems or platforms for reviews of legal providers (attorneys, law firms, etc.); professional and career-based recommendations; reviews of restaurants, bars, and similar venues; reviews of products or services provided at a digital marketplace; or any other suitable contemplated use for reviews, ratings, or recommendations.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein:

FIG. 2B is a flow chart illustrating additional steps that may be performed in accordance with some embodiments.

FIG. 4D illustrates an example of a review-in-progress which is generated for a user to complete, according to one example embodiment.

DETAILED DESCRIPTION

Figure 1A:
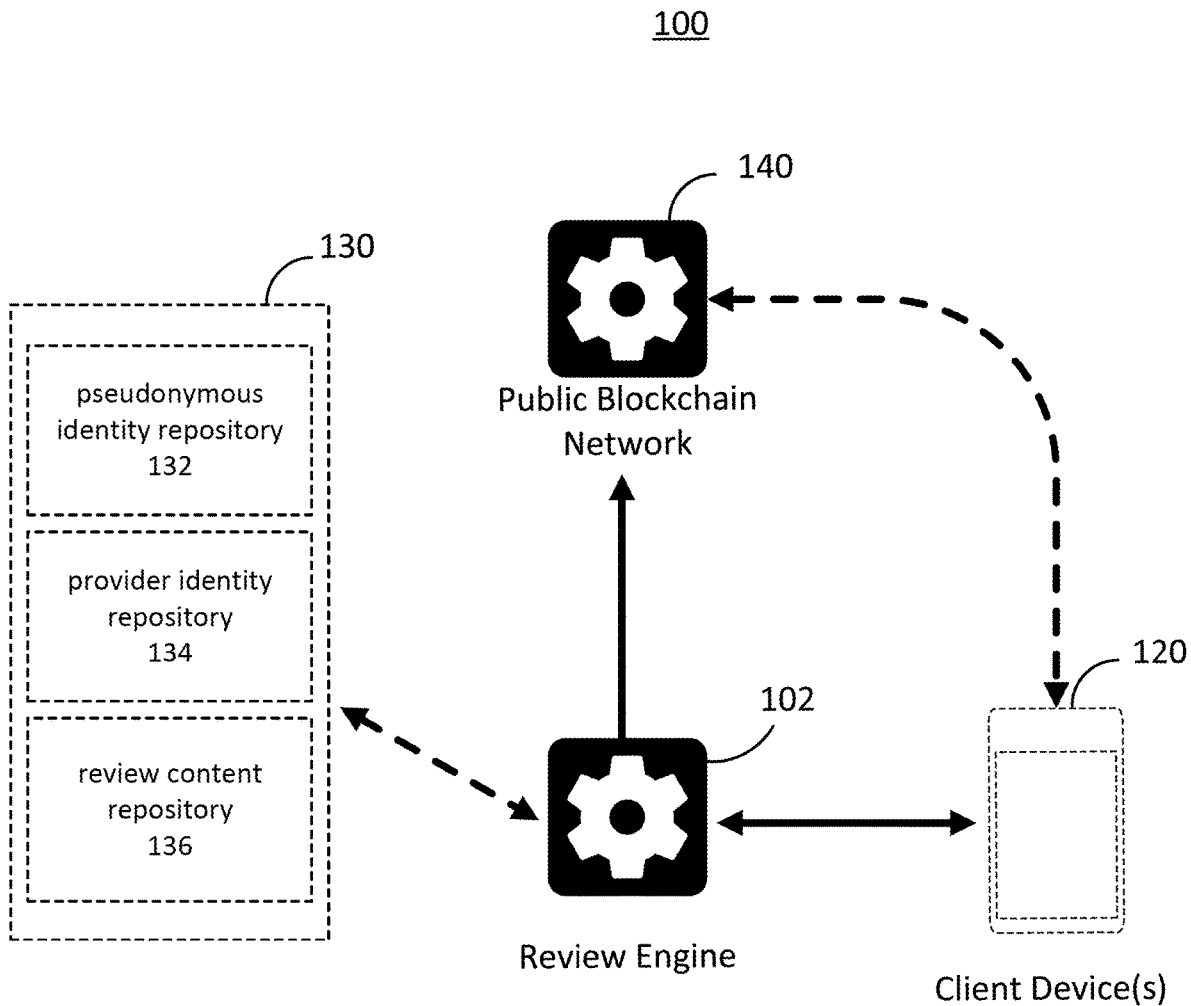
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

I. Exemplary Environments

FIG. 1A is a diagram illustrating an exemplary environment in which some embodiments may operate. In the exemplary environment 100, one or more optional client device(s) 120 are connected to a review engine 102. The review engine 102 is connected to a public blockchain network 140 for the purposes of recording transaction records to the public blockchain network 140, and optionally connected to one or more database(s) 150, including a pseudonymous identity repository 130, provider identity repository 132, and/or review content repository 134. One or more of the databases may be combined or split into multiple databases. The review engine and/or client device in this environment may be computer devices or hosted on computer devices.

The exemplary environment 100 is illustrated with only one client device, one public blockchain network, and one review engine for simplicity, though in practice there may be more or fewer instances of each. In some embodiments, one or more of these components may be part of or hosted on the same computer or device.

In one embodiment, the review engine 102 may perform the method 200 (FIG. 2A) or other method herein and, as a result, provide review content which can be verified on a public blockchain network. In some embodiments, this may be accomplished via communication with the client device(s), public blockchain network(s), or other components of the system over a network. In some embodiments, the review engine 102 is an application hosted on a computer or similar device, or is itself a computer or similar device configured to host an application to perform some of the methods and embodiments herein.

Optional client device(s) 120 are devices that are configured to display information in a user interface and allow for entering, generating, sending, and receiving information. In some embodiments, the client device 120 is associated with a user of the review engine. In some embodiments, one or more client devices 120 may be associated with a provider on the review engine, additional users, or other entities. In some embodiments, client device 120 is a computing device capable of hosting and executing one or more applications or other programs capable of sending and/or receiving information. In some embodiments, the client device 120 may be a computer desktop or laptop, mobile phone, virtual assistant, virtual reality or augmented reality device, wearable, or any other suitable device capable of sending and receiving information. In some embodiments, the review engine 102 may be hosted in whole or in part as an application executed on the client device 120. In some embodiments, the review engine 102 may be a web site or web service. In some embodiments, client device 120 may also be represented by or relate to a physically printed medium, particularly with respect to the generation and capture of unique authentication tokens generated by/for a provider.

Optional database(s) 130 including one or more of a pseudonymous identity repository 132, provider identity repository 134, and/or review content repository 136 function to store and/or maintain, respectively, information such as pseudonymous identities which have been assigned to users, identities of providers, and the content of reviews. The optional database(s) may also store and/or maintain any other suitable information for the review engine 102 to perform elements of the methods and systems herein. In some embodiments, the optional database(s) can be queried by one or more components of system 100 (e.g., by the review engine 102), and specific stored data in the database(s) can be retrieved. In some embodiments, some or all elements of database(s) 130 will reside on private servers. In some embodiments, some or all elements of database(s) 130 will reside on public, decentralized, peer-to-peer storage networks or protocols, such as, e.g., the InterPlanetary File System (IPFS) or Swarm. These protocols provide for storage of files as fragments or shards that are split among a number of peer nodes in a network, and access to reconstitute and view/download the files can be controlled via encryption.

Public blockchain network 140 is a publicly-accessible, distributed digital ledger of data that is shared among a network of independent parties. When a user or entity within the blockchain network wants to add a record, or "transaction", to a blockchain, users and entities in the blockchain with validation control verify the proposed transaction. In this fashion, blockchains are peer-to-peer systems wherein data integrity is maintained through a large distributed network. Components within a given blockchain include a block, or list of transactions recorded into a ledger over a given period; a chain, or hash that links one block to another; and a network composed of full nodes, with each node containing a complete record of all the transactions recorded within the blockchain. These transactions can record not only the details of any exchanged value but also any associated data payload linked to the transactions. In some cases, data should not be included in the blockchain, either due to their size, their sensitivity, or some other element of unsuitability; such data can still be hashed, though, with their hash output included as part of the data payload in the blockchain. Any user accessing the public blockchain network may therefore query the blockchain and confirm the presence of hashed data stored as part of prior transactions, but the user would not have the corresponding ability to back-solve the hashed output to determine the original data input. The blockchain can thereby act as a repository of hashed data against which the original input data can be checked—using the same hash function—to determine whether their contents were compromised or modified in any way as compared to the original source data.

Figure 1B:
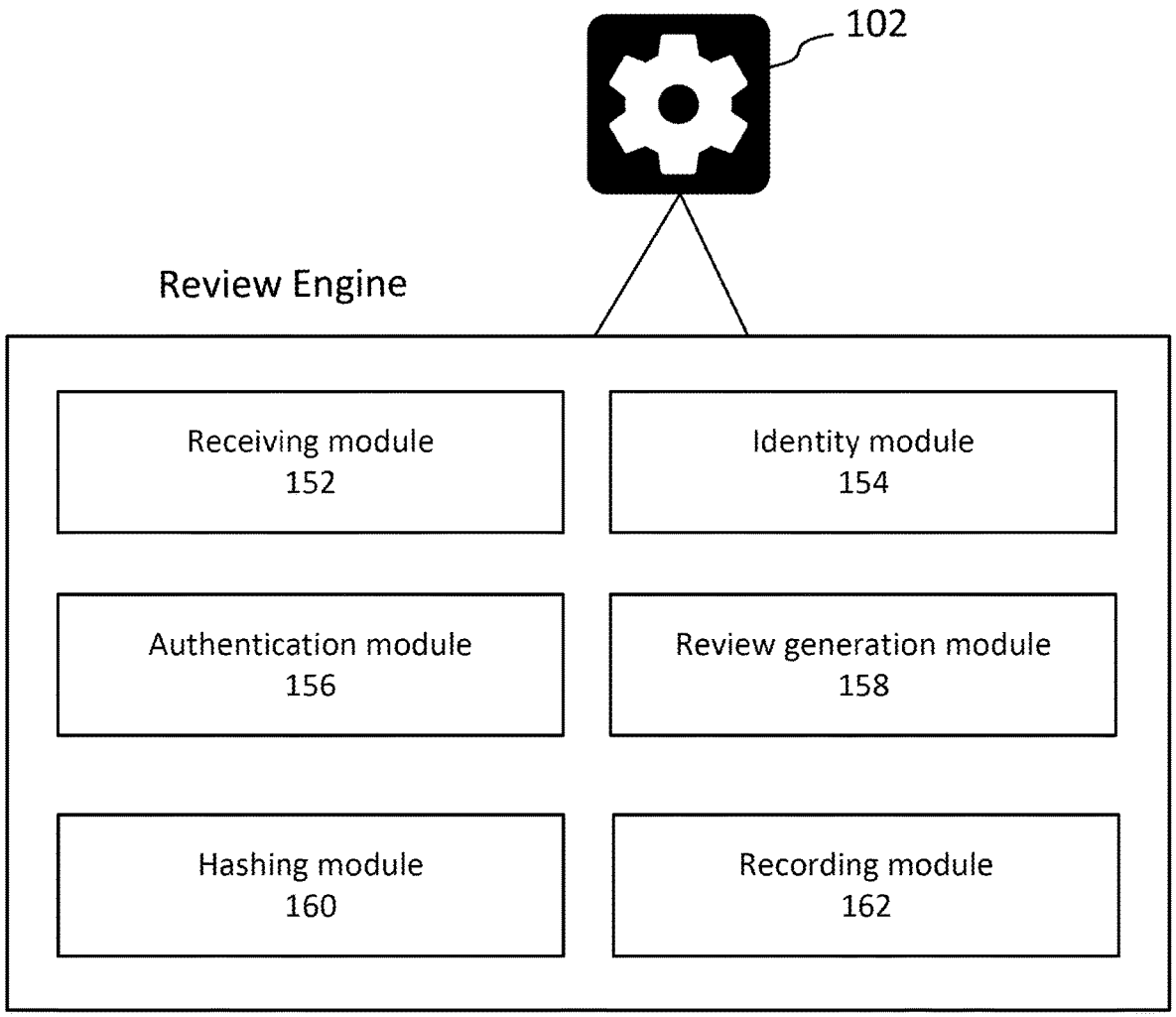
FIG. 1B is a diagram illustrating an exemplary computer system that may execute instructions to perform some of the methods herein.

FIG. 1B is a diagram illustrating an exemplary computer system 150 with software modules that may execute some of the functionality described herein.

Receiving module 152 functions to receive information from one or more sources, such as a client device 120 which sends information to the review engine 102. Input information can include, e.g., identity verification, completed reviews, or any other suitable information.

Identity module 154 functions to verify the identities of users and providers and assign a unique pseudonymous identity to users based on those identity verifications.

Authentication module 156 functions to generate an authentication token unique to the provider.

Review generation module 158 functions to provide a review-in-progress to be displayed for a user upon the user capturing the authentication token.

Hashing module 160 functions to hash one or more pieces of data associated with the completed review.

Recording module 162 functions to record hashed data associated with the completed review in a transaction record on the public blockchain network.

The above modules and their functions will be described in further detail in relation to an exemplary method below.

Various aspects of this exemplary embodiment will be described in further detail in relation to an exemplary method below.

II. Exemplary Method

Figure 2A:
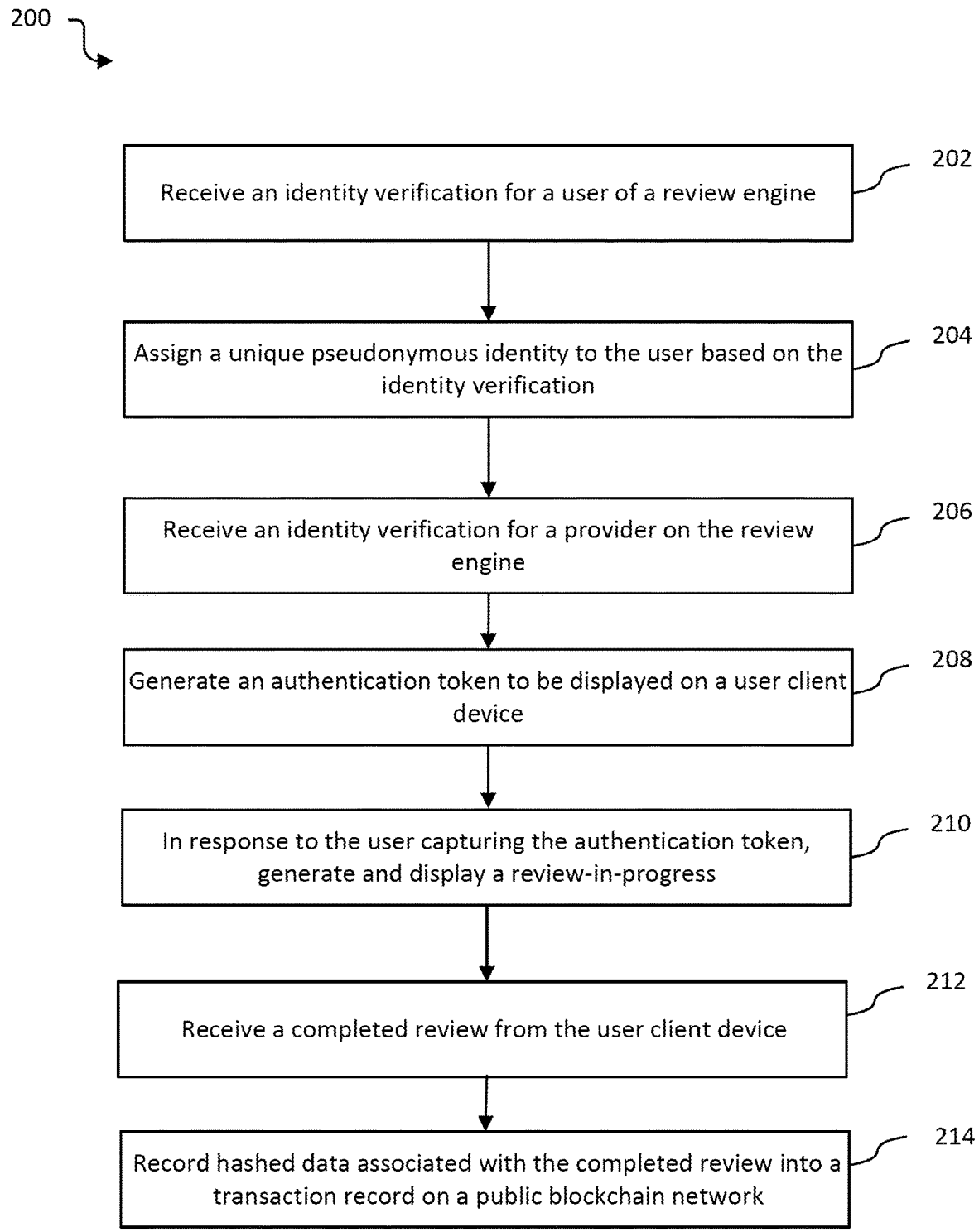
FIG. 2A is a flow chart illustrating an exemplary method that may be performed in some embodiments.

FIG. 2A is a flow chart illustrating an exemplary method that may be performed in some embodiments.

At step 202, the system receives an identity verification for a user of a review engine. In some embodiments, the identity verification is a Know Your Customer (KYC) process or set of processes which ensures that only one user identity is associated with the user, and that there are no duplicate identities for the same user. In some embodiments, a third party identity verification service is employed to perform the identity verification and send the results output to the system. For example, an Application Programming Interface (API) from a third party digital identification provided may be used. Alternatively, a KYC process internal to the system or its components may be used.

In some embodiments, other steps of the method may be performed without the identity verification being completed or without the identity verification being passed. In such cases, the review process will remain in an unverified state until certification is completed at a later time.

At step 204, the system assigns a unique pseudonymous identity ("pseudonym") to the user based on the identity verification. In some embodiments, the pseudonymous identity is unique to each user within the review system. In some embodiments, the pseudonymous identity may be a hexadecimal-based pseudonym. The pseudonym functions to de-identify the user such that the user's personal information is not shared inadvertently. In some embodiments, the pseudonym is persistent for the user, and carries over to be associated with all reviews from that user. In other embodiments, the pseudonym is not persistent and it used only one time per review from the user. In some embodiments, the pseudonymous identity is not shared with the user, nor other users of the review engine. Instead, it is internal to the system and not external-facing nor displayed via any user interfaces. In some embodiments, a separate external-facing screen name may be chosen by the user for use within social or communicative aspects of the review engine, such as communicating with other users of the review engine and publicly listed name for reviews written by the user. In such cases, the chosen screen name may be linked internally to the pseudonym, but the pseudonym is not disclosed to any users.

At step 206, the system receives an identity verification for a provider on the review engine. The provider is an individual, representative of a business, or other entity or organization representative who is subject to review through the review engine. The provider is onboarded through the review engine, subject to an internal KYC process. In some embodiments, the internal KYC process requires the provider to send one or more documents providing evidence of certification and/or evidence that the provider is who they claim to be. For example, if the provider is a doctor and the review relates to a doctor-patient relationship during a check-up, then the provider would be required to certify that they are a trained, certified doctor. In some embodiments, the identity verification for the provider associates the provider with a public profile on the review engine. The public profile is a location within the user interface of the review engine which allows users to access reviews of the provider completed by various users of the review engine.

In some embodiments, the identity verification for the provider includes a verification from the provider that the transaction between the provider and the user occurred. In some embodiments, this may be some form of submitted statement, document, or other express or implied form of verification that the interaction was a genuine one that actually took place. In some embodiments, the provider sharing the authentication token with the user is itself a tacit acknowledgement and verification that the interaction is genuine and actually occurred.

At step 208, the system generates an authentication token to be displayed on a client device. In some embodiments, the client device is associated with the provider. The provider receives the authentication token and can share it with users they have interacted with, in order to demonstrate that the user has indeed interacted with the provider. In some alternative embodiments, the client device is associated with the user of the review engine and the client receives the authentication token directly to be used. In some embodiments, the authentication token may be a QR code or other visual code that can be captured by the user on the user client device (e.g., by pointing a mobile phone camera at the QR code). In some embodiments, the authentication token may additionally or alternatively be a numerical code (e.g., a 4-digit PIN or access code), alphanumeric password, or any other form of authentication. In some embodiments, the authentication token is unique and only a single use of that token is allowed such that the token is intended for the specific interaction between the user and the provider. In some embodiments, the authentication token is in fact a non-fungible token ("NFT") associated with a public blockchain. NFTs are tokens that leverage public blockchain protocols to allow verifiable digital scarcity and/or uniqueness according to published and protocol-wide standards (for example, ERC-721 or ERC-1155 token standards within the Ethereum network).

At step 210, in response to the user capturing the authentication token, the system generates and displays a review-in-progress on the user client device. In some embodiments, upon the provider sharing the authentication token with the user, the user captures the authentication token by, e.g., enabling a camera application on the user's mobile phone and pointing it in the direction of the QR code, or entering the correct access code. The user's client device then opens a mobile application or prompts the user to download one, opens a web application, opens a web site, or otherwise triggers a user interface to begin a review (i.e., a review-in-progress, since the review is not yet completed). In some embodiments, capturing the authentication token enables the user to begin a review on the user interface at a later time rather than immediately. In some embodiments, the review-in-progress is itself an NFT issued on a blockchain network, acting, in essence, as a ticket or proof of admittance, the redemption of which allows the holder this one, unique opportunity to complete the review associated with a given interaction.

In some embodiments, the patient accesses the review-in-progress via the authentication token being captured, and completes the review on the provider or the provider's product/service. In some embodiments, the review relates to various aspects of the interaction or transaction between the provider and the user, including how the provider rates along various aspects, events, or characteristics. For example, a review may be in the form of a survey which involves a series of questions that allow a rating of 1 to 5 to be assigned for each question, along with optional narrative comments. In some embodiments, the user may be asked to quantitatively rate or rank the provider in some form (e.g., assign a score between 1 and 100). In some embodiments, a review includes no ranking or rating component, and simply includes one or more narrative comments or prompts.

At step 212, the system receives a completed review from the user client device. This is initiated by the user submitting a completed review. In some embodiments, upon the submitting of the completed review, if the patient has not yet confirmed their identity (e.g., the KYC or identity verification process from step 202), the review will be stored in a provisional or unverified state. The review will remain in this state until the user's identity is verified.

In some embodiments, once the review is completed and received by the system, the system provides a reward to the user. Such reward can take a variety of forms. In some embodiments, the reward may be, e.g., a blockchain-based digital currency, a blockchain-based dividend token representing a share of revenue or profit in the review engine (such that, for example, the user is rewarded for helping the developer by participating in the benefits of the platform), and/or a blockchain-based token not traded on the open market but rather used internally to the system and exchanged later (e.g., through an atomic swap for Ethereum, a Bitcoin off-ramp, a money transmitter employed to exchange between digital currency and fiat currency, or any other suitable method of exchange).

In some embodiments, in addition to receiving the completed review from the user, the system also receives manual confirmation from the user of the transaction between the provider and the user. This manual confirmation may be some statement, document, or other express form of acknowledgment, some implied form, or any other suitable form of manual confirmation.

At step 214, upon receiving the completed review, the system records hashed data associated with the completed review into a transaction record on a public blockchain network. The hashed data is recorded such that the transaction record can be publicly audited on the public blockchain network. In some embodiments, the system hashes one or more pieces of data associated with the completed review. In various embodiments, this may include one or more of: the pseudonymous identity of the user that was assigned; the verified identity of the provider; the contents of the completed review; or any other relevant pieces of data. In one embodiment, all three of the above pieces of data are hashed (the pseudonymous identity of the user, verified identity of the provider, and the contents of the completed review. In some embodiments, the contents of the completed review are used to generate a machine-readable file, such as a JavaScript Object Notation ("JSON") file or other JavaScript-readable file, which includes the contents of the completed review. The machine-readable file is then hashed and becomes part of the hashed data. In some embodiments, the hashing function is SHA256 and is used to create unique outputs using the above-mentioned input elements. In some embodiments, another hashing function, such as KECCAK-256 (SHA-3) is used to create these unique outputs. In some embodiments, other hashing algorithms from the Secure Hash Algorithm family of standards will be employed for this purpose. In each case, the hashing function takes a given input and deterministically creates a hash output, such that a given input will always yield the exact same output, while even a slightly different initial input will yield a completely different hash output. Meanwhile the mathematical encryption process associated with the hashing algorithm prevents back-solving from a hash output to determine the original input. Use of a hashing algorithm thus enables absolute confirmation that an input has not been altered, while still protecting the original input from being discovered.

The system records the transaction record to the public blockchain network by sending the transaction record to the public blockchain (e.g., an Ethereum-based public blockchain network, or any other suitable public blockchain network). In some embodiments, the transaction record contains the following information: a hash of the user's pseudonymous identity, a hash of the doctor's verified identity, and a hash of the actual contents of the completed review. In some embodiments, the transaction record contains a hash of a JSON file containing all of these elements, or a hash of another type of file containing a collection of all of these elements in a machine-readable format. The transaction record, once confirmed on the public blockchain, may also provide a timestamp indicating when the review was completed. In some embodiments, any of the aforementioned elements (e.g., user identity, provider identity, or review content) or any other suitable elements may be represented by a non-fungible token ("NFT"), the unique cryptographic identity of which can also be hashed and stored in a blockchain transaction record.

In some embodiments, the system publishes the completed review from the user, such that it is accessible to at least users of the review engine via a user interface on a given user's client device. For example, the review engine may provide a user interface by which users can search for, browse, and otherwise navigate through reviews by the user and any other user. In some embodiments, the system provides access to all previously published reviews for the provider, through searching, browsing, or other forms of navigation. In some embodiments, the system associates the provider with a public profile for that provider, which is a publicly-facing profile providing users with the ability to navigate to reviews from users for that provider.

In some embodiments, the system provides a publicly auditable record to demonstrate that no reviews have been modified, censored, or otherwise tampered with or altered. The system provides, to a number of users of the review engine, the hashed data associated with the completed review, such that the users of the review engine can check the hashed data against the transaction record on the public blockchain network to verify that the contents of the transaction record have not been altered. This public auditability allows anyone to ensure the authenticity of the review and any associated data and/or metadata, including at least its contents and the date and time of its creation. In some embodiments, a number of elements are provided to the user and/or one or more other users of the review engine for each review: a transaction identification (ID) number (i.e., review ID) and a link to the transaction record on a blockchain explorer (such as, e.g., etherscan.com), including the components listed above that were written to the blockchain; the user's pseudonymous identity and/or provider identities in hash format; the completed review contents in JSON or other machine-readable and/or human-readable format, with a button to copy these contents; the hash output from the JSON file; and/or a link to an independent online hash calculator (such as, e.g., an SHA256 hash calculator), where the user can paste the JSON file and prove that the hash output is identical to what was recorded on the public blockchain in the transaction. In some embodiments, some of these elements are provided exclusively to the user, while others are provided to both the user and other users.

In some embodiments, the original contents of the rating and review, having been linked to the user and provider identities and subsequently verified, are now stored on private servers. In some embodiments, these contents of the rating and review are encrypted and housed on a decentralized file storage network, such as, e.g., IPFS. In either case, the contents of the rating & review are made viewable on the user interface.

FIG. 2B is a flow chart illustrating additional steps that may be performed in accordance with some embodiments.

At optional step 222, the system hashes one or more of the pseudonymous identity of the user, verified identity of the provider, and/or contents of the completed review to generate the hashed data, as described above.

At optional step 224, after the system records the hashed transaction record to the public blockchain and publishes the review on the review engine, the system then provides this hashed data to users of the review engine such that they can check the hashed data against the transaction record on the public blockchain network to verify that the contents have not been altered, as described above.

Figure 3:
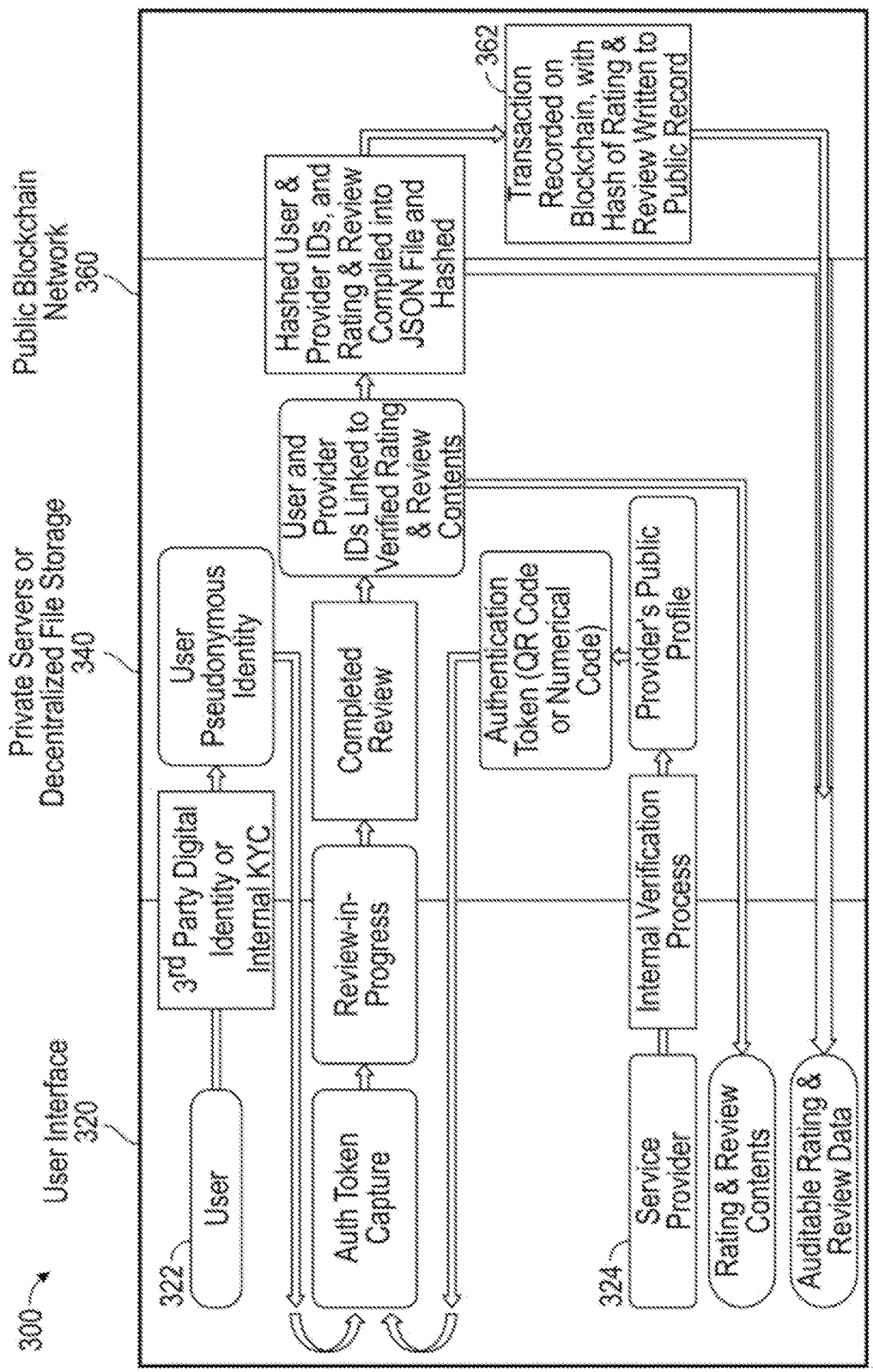
FIG. 3 is a flow chart illustrating one example embodiment of providing review content in accordance with some embodiments.

FIG. 3 is a flow chart illustrating one example embodiment 300 of a potential flow of events for providing review content which is verifiable on a public blockchain. In this example and according to some embodiments, the user of the review engine is a customer of a service, the provider on the review engine is a provider of the service, and a completed review as described herein represents a review of the provider by the customer. In some examples as used here for illustrative purposes, the user is more specifically a patient of a doctor, and the provider is the doctor with whom the patient interacted. The review content constitutes a review of the doctor-patient interaction during a doctor visit by the user. Thus, the example can illustrate, among other use cases, a review process for physicians by their patients which allows for blockchain-based verification and auditability. Such a review process allows for patients to rate, review, and evaluate doctors and their overall patient experience by initiating a blockchain interaction using a pseudonymous identity and storing the data until identity confirmation is completed. This specific example will be used in the descriptions for FIGS. 3 and 4A-4E. These figures should be understood to be applicable to such an example or potentially many other use cases and examples.

The left side of the flow chart represents a User Interface 320. At a user interface for a user 322, the user is onboarded to the review engine (e.g., the user signs into an existing account, signs up for a new account, or otherwise is onboarded). As part of the onboarding process, the user identity is verified. This may be done by a third party digital identity service or internal KYC process. This process may triangulate the user's social media identity or identities, documents such as a driver's license or other identity-verifying documents, and/or any other relevant forms of verifying identity. In some examples, this is to certify that one patient is to complete only one review of the physician. The user is then assigned a pseudonymous identity which is unique to that user and internal to the review engine. In this way, the user is de-identified such that the user will not be sharing any personal information inadvertently. In various embodiments, the pseudonymous identity may be stored on private servers and/or decentralized file storage 340.

Meanwhile, at a user interface for a service provider 324, such as the doctor, the service provider is onboarded into the review engine through a more involved internal verification process. This is to ensure that there is no duplication of the service provider's identity, as well as, e.g., to ensure that the doctor is a certified physician. Documents certifying the doctor is a certified physician will be required to be sent by the doctor to the review engine at this point. Unlike the patient, the doctor will have a public profile on the private servers or decentralize file storage 340 which is tied to the doctor's verified identity, as described above. The system then generates an authentication token (e.g., a QR code, numerical code, or any other suitable form of code). At the user interface, the doctor gives the authentication token to the patient. In some embodiments, this may be by sharing the authentication token digitally with the patient through the review engine or some other method, printing out the QR code and handing it to the patient, or some other form. In some embodiments, the authentication token is an NFT that can be transmitted to the user. Once the user captures the authentication token (by, e.g., scanning the QR code with a mobile device, entering the correct access code, or other method), the system generates a review-in-progress, which is hosted on the user interface for the user. In some embodiments, the review-in-progress is an NFT that remains in the user's possession until the user redeems it (i.e., submits the non-fungible token via an NFT redemption mechanism, thereby relinquishing possession of it) in exchange for the right to finalize the review. The user then completes the review, and the system processes the review internally. Both the user's pseudonymous identity and the doctor's verified identity are then linked to verified rating and review contents from the completed review.

The review engine then hashes the user's pseudonymous identity and the doctor's verified identity. These elements are compiled into a JSON file along with the completed review contents (including rating if applicable) as a string of data. This compiled JSON file is then hashed again to generate a hashed transaction record. On the public blockchain network 360, the system records the hashed transaction record 362, which is written to the public record permanently. In this way, a unique, deterministic output is created. Users of the review engine cannot determine who the patient was on the public blockchain, but can confirm that nothing was altered if they have the requisite hashed inputs to perform the confirmation. The review is also published on the review engine, and the review can be read by anyone using the review engine. For those who wish to audit, the review engine provides input values which can be used to check the legitimacy of the review. Thus, anyone can confirm the contents have not been altered, can confirm the hash output for the input values, and can check the hash output against the transaction record; however, they cannot ascertain the identity of the reviewer, nor the identity of the provider, nor the contents of the review simply by viewing the data stored on the public blockchain.

The review contents are all stored on the review engine's servers and/or storage locations. While the patient should refrain from providing more information than is necessary in rating and reviewing doctors, the review itself is stored at the review engine's servers and/or storage locations. In some embodiments, while the transaction record cannot be removed from the public blockchain and is there permanently, what appears on the user interface of the review engine is from the servers and/or storage locations and can be removed. This provides some level of control such that if, for example, a user divulges too much information and requests to have some of it removed, the review engine can facilitate the request and remove some or all of the review contents accordingly. In some embodiments, the system thereafter provides a notification so that users of the platform can see that the review is no longer presented in its original state. Similarly, if a review contains content (such as, e.g., abusive language) which violates the terms of service associated with the application, the violating content can be blocked from display on the user interface. In some embodiments, decentralized servers and/or storage mechanisms (e.g., peer-to-peer file storage protocols such as IPFS or Swarm) are employed such that no central authority is in control of the content, even though access to the content may be restricted via various encryption methods. In some embodiments, one or more filters may be employed to catch any content which should not be posted, before the review is posted. This may be, for example, offensive content, content which violates the review engine's terms of service, or any other content which may be suitably filtered out. This allows the review engine to filter out such content before anything is placed publicly and permanently on the blockchain.

Figure 4A:
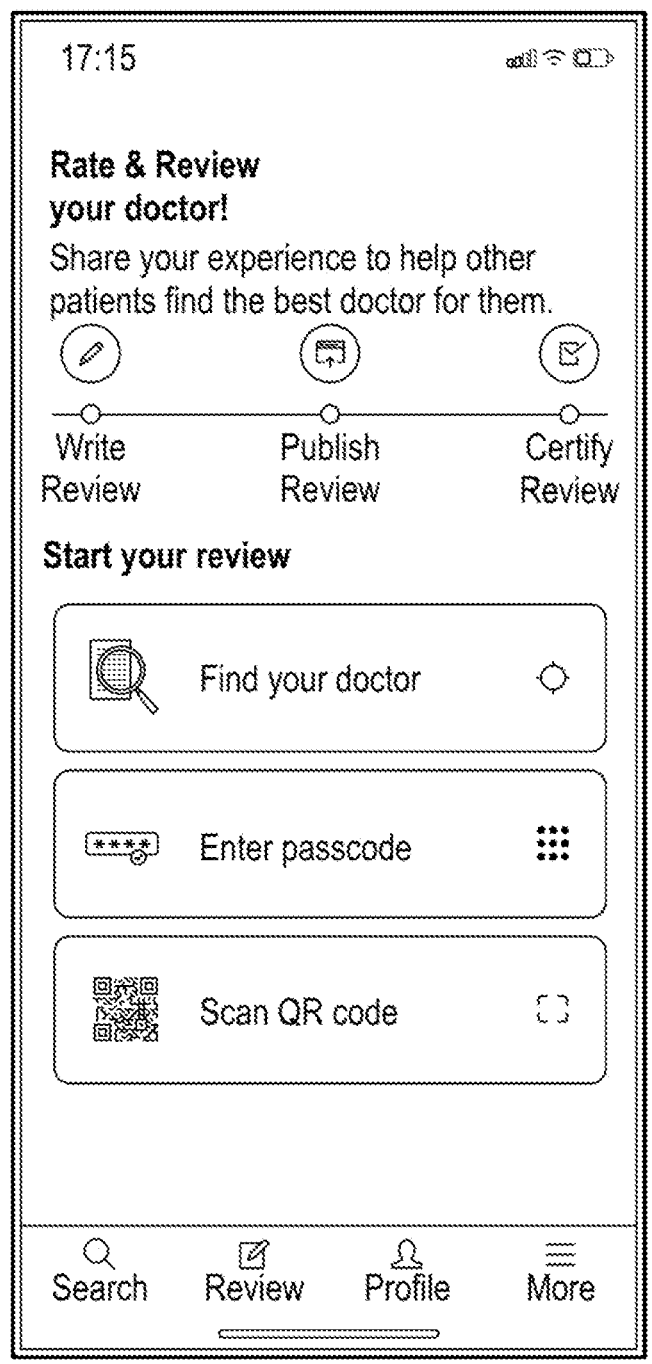
FIG. 4A is a figure illustrating an example of a user interface for a patient to initiate a review of a doctor, according to one example embodiment.

FIGS. 4A through 4E illustrate aspects of the above example embodiment. FIG. 4A is a figure illustrating an example of a user interface for a user 400 to initiate a review. After the onboarding process is complete with user identity verification is performed, the user is presented with a user interface screen allowing them to find their doctor, enter a passcode, or scan a QR code.

Figure 4B:
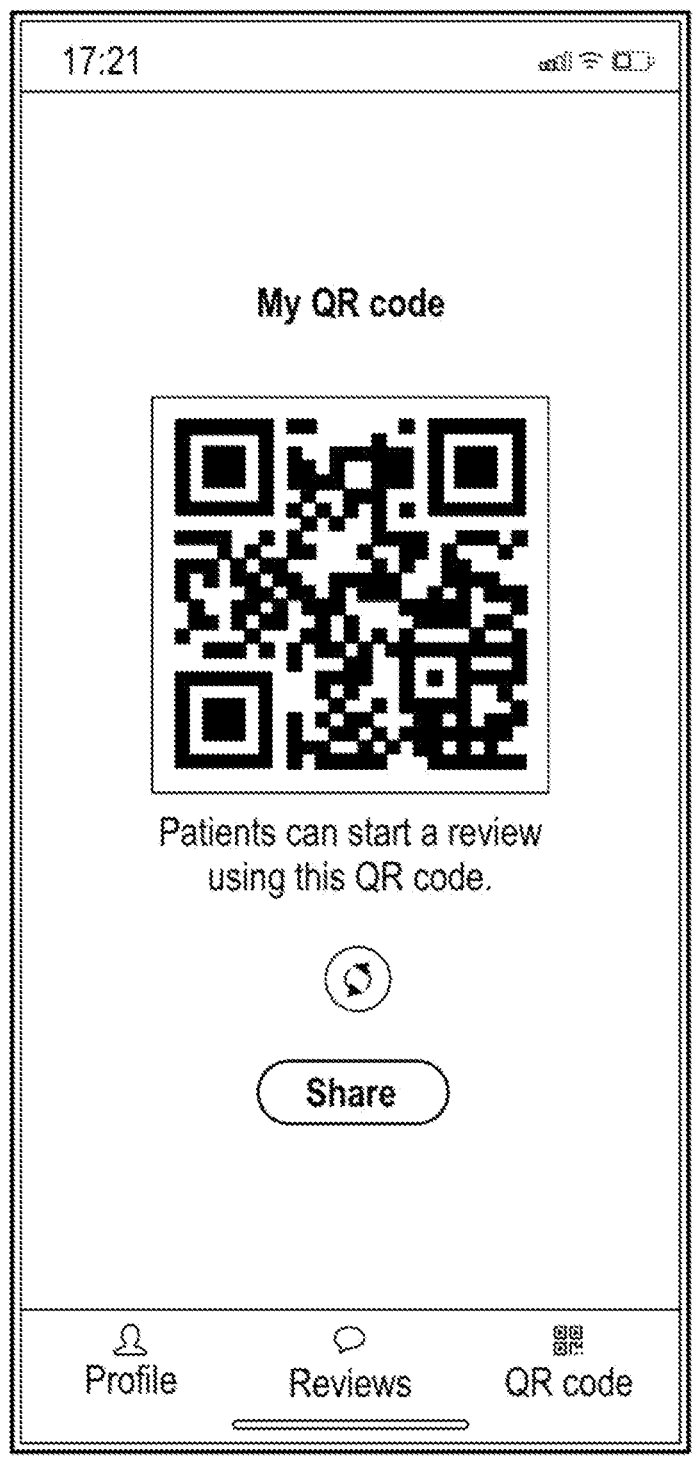
FIG. 4B is a figure illustrating a user interface of a doctor on the review engine, according to one example embodiment.

FIG. 4B illustrates a user interface of a doctor 430 on the review engine. A QR code is presented to the doctor or the doctor's representative (such as a nurse or administrator). Patients can start a review using this QR code. An option is provided for the doctor or doctor's representative to share the QR code. Upon clicking the "Share" button, a list of patients may be presented; selecting or inputting the patient's name at this time enables the creation of the review-in-progress prior to the patient having to log in to the application, such that the review-in-progress is ready for the patient to begin at a later time.

Figure 4C:
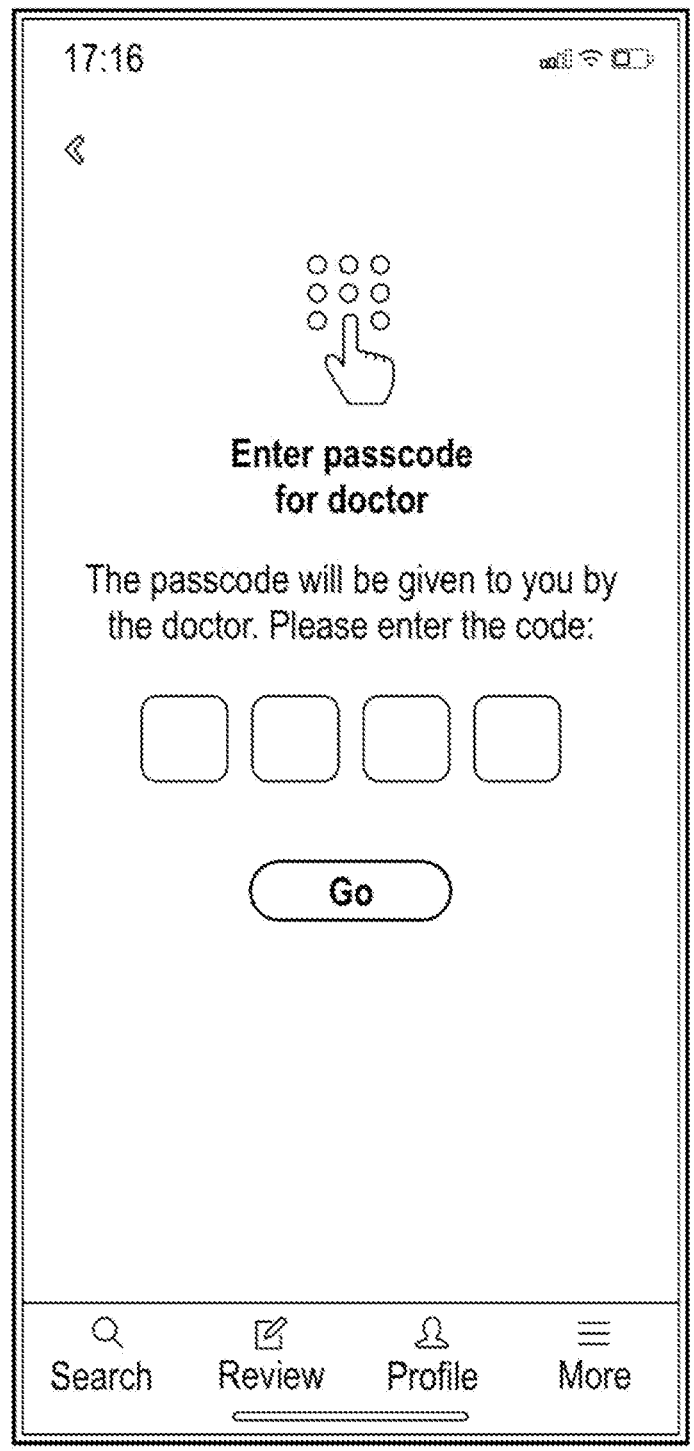
FIG. 4C illustrates a user interface for a user which allows a patient to enter a passcode for their doctor, according to one example embodiment.

FIG. 4C illustrates a user interface for a user 440 which allows the user to enter a passcode for their doctor. The passcode is to be given to the patient by the doctor. The user can then enter the passcode into the user interface.

FIG. 4D illustrates an example 460 of a review-in-progress which is generated for a user to complete. In the review, the user is provided with the ability to rate the doctor between 5 options for each of a set of parameters, e.g., discussion of their diagnosis, whether the doctor answered all of their questions, etc. A narrative form is also provided which allows the user to provide further details about the experience and the doctor's communication.

Figure 4E:
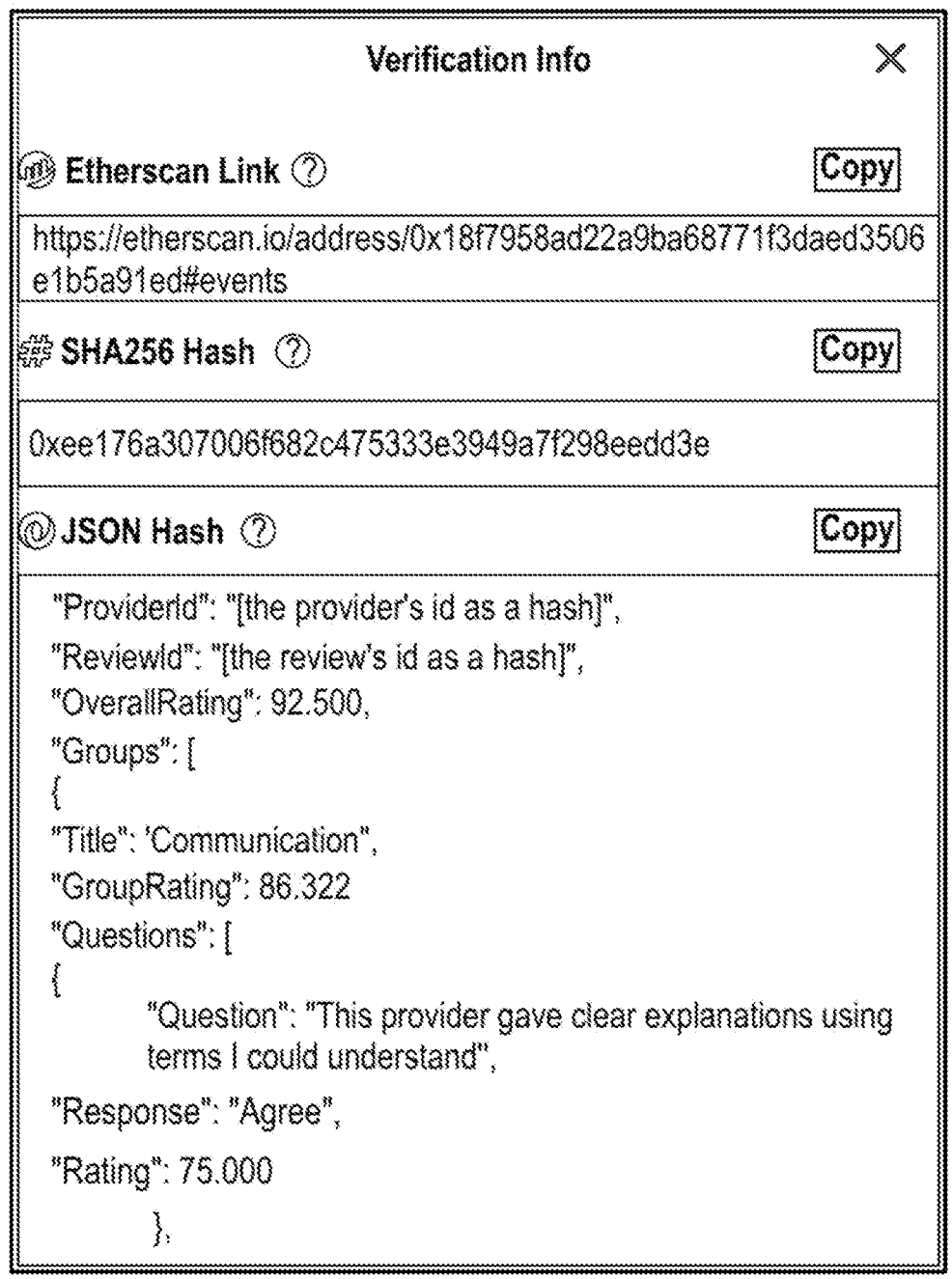
FIG. 4E illustrates an example of verification info provided for a completed review which is published on a review engine, according to one example embodiment.

FIG. 4E illustrates an example 490 of verification info provided for a completed review which is published on the review engine. The verification info can be accessed by anyone who can access the review, and includes a link to the transaction record (in this case, an Etherscan link), a SHA256 hash of the user's pseudonymous identity and doctor's verified identity, and a JSON hash of the review contents as well as the above hashed elements. Users can use these inputs to check the transaction record against the contents of the public blockchain to verify that the contents have not been altered.

Figure 5:
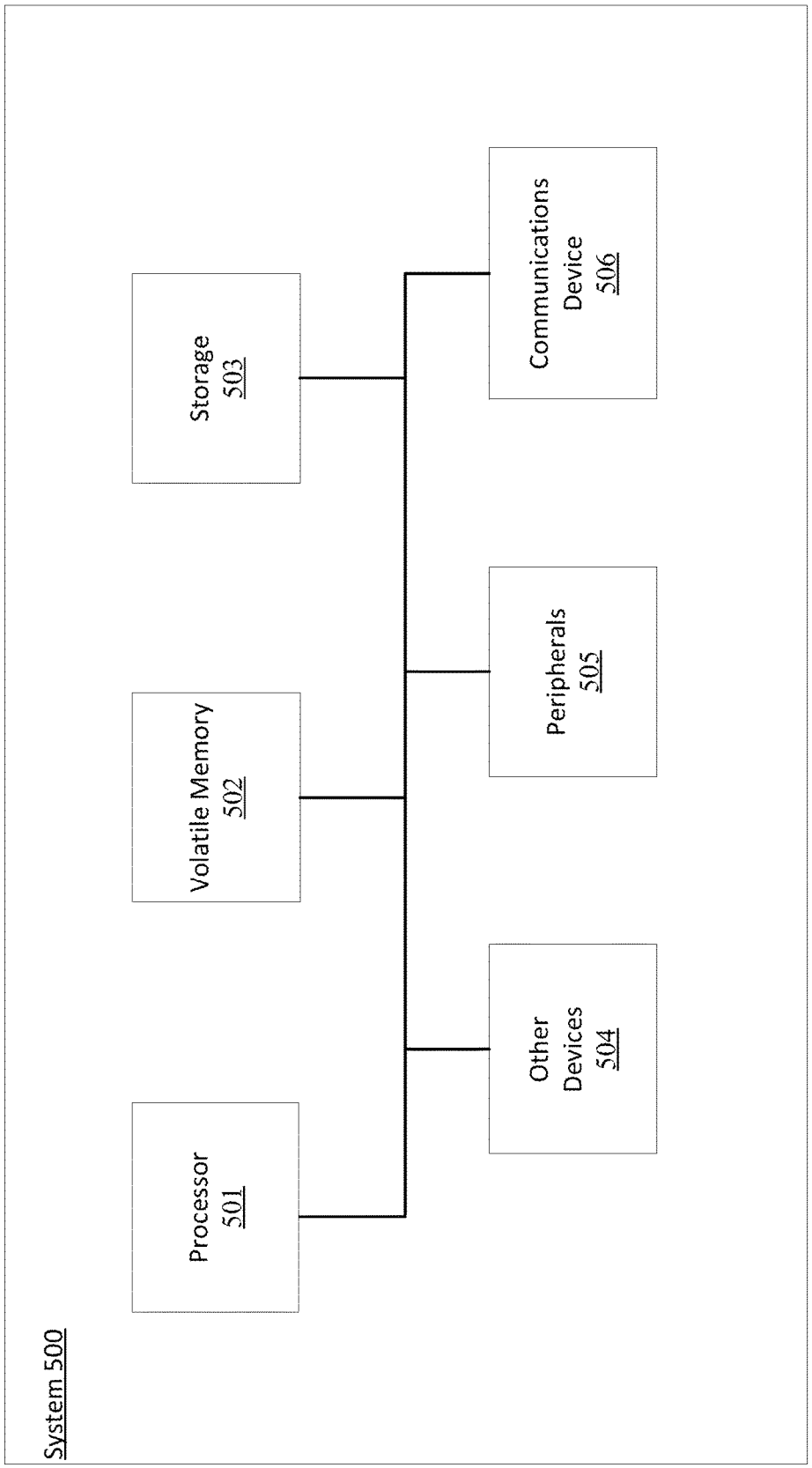
FIG. 5 is a diagram illustrating an exemplary computer that may perform processing in some embodiments.

FIG. 5 is a diagram illustrating an exemplary computer that may perform processing in some embodiments. Exemplary computer 500 may perform operations consistent with some embodiments. The architecture of computer 500 is exemplary. Computers can be implemented in a variety of other ways. A wide variety of computers can be used in accordance with the embodiments herein.

Processor 501 may perform computing functions such as running computer programs. The volatile memory 502 may provide temporary storage of data for the processor 501. RAM is one kind of volatile memory. Volatile memory typically requires power to maintain its stored information. Storage 503 provides computer storage for data, instructions, and/or arbitrary information. Non-volatile memory, which can preserve data even when not powered and including disks and flash memory, is an example of storage. Storage 503 may be organized as a file system, database, or in other ways. Data, instructions, and information may be loaded from storage 503 into volatile memory 502 for processing by the processor 501.

The computer 500 may include peripherals 505. Peripherals 505 may include input peripherals such as a keyboard, mouse, trackball, video camera, microphone, and other input devices. Peripherals 505 may also include output devices such as a display. Peripherals 505 may include removable media devices such as, e.g., hard drives, solid state drives, or flash drives. Communications device 506 may connect the computer 100 to an external medium. For example, communications device 506 may take the form of a network adapter that provides communications to a network. A computer 500 may also include a variety of other devices 504. The various components of the computer 500 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method for providing review content which is verifiable in a public blockchain network, comprising: receiving an identity verification for a user of a review engine; assigning a unique pseudonymous identity to the user based on the identity verification, wherein the unique pseudonymous identity is associated to the identity verification and is unique to the user; receiving an identity verification for a provider on the review engine; generating an authentication token unique to the provider to be displayed on a user client device associated with the user of the review engine, the authentication token indicating an interaction by the user with a product or a service of the provider; in response to the user capturing the authentication token via the user client device, generating a review-in-progress to be displayed on the user client device; receiving a completed review from the user client device; and recording hashed data associated with the completed review into a transaction record on a public blockchain network, such that the transaction record can be publicly audited on the public blockchain network, the hashed data including the pseudonymous identity and a verified identity of the provider.

2. The method of claim 1, further comprising: hashing one or more of the pseudonymous identity of the user, the verified identity of the provider, and the contents of the completed review to generate the hashed data associated with the completed review.

3. The method of claim 1, further comprising: generating a machine-readable file comprising the contents of the completed review; and hashing the machine-readable file to generate the hashed data associated with the completed review.

4. The method of claim 1, wherein the unique pseudonymous identity comprises a screen name linked with the pseudonymous.

5. The method of claim 1, wherein the user of the review engine is a customer of a service, the provider on the review engine is a provider of the service, and the completed review represents a review of the provider by the customer.

6. The method of claim 1, wherein the user of the review engine is a patient, the provider on the review engine is a doctor, and the completed review represents a review of the doctor by the patient.

7. The method of claim 1, wherein at least one of the authentication token and the review-in-progress is a non-fungible token (NFT) issued on the public blockchain network.

8. The method of claim 1, wherein a plurality of decentralized servers and/or storage mechanisms are employed such that no central authority is in control of the review-in-progress nor the completed review.

9. The method of claim 1, wherein the identity verification for the user is received from one of: a third-party identity verification service, or an internal Know Your Customer (KYC) process.

10. The method of claim 1, further comprising: providing, to a plurality of users of the review engine, a machine-readable file containing the input data associated with the completed review, and a hash of the input data, such that the users of the review engine can check at least the input data against the hash and the hash against the associated transaction record on the public blockchain network to verify that the contents of the review and the associated transaction record have not been altered.

11. The method of claim 1, further comprising: publishing the completed review from the user such that it is accessible to at least users of the review engine via a user interface.

12. The method of claim 8, further comprising: receiving a request from the user to remove the completed review from the user; and removing the completed review from the user such that it is no longer accessible to at least users of the review engine via the user interface.

13. The method of claim 1, wherein the identity verification for the provider associates the provider with a public profile.

14. The method of claim 10, further comprising: providing, on the public profile of the provider, access to all previously published reviews for the provider.

15. The method of claim 1, wherein the identity verification for the provider comprises a verification from the provider that the transaction between the provider and the user occurred.

16. The method of claim 1, wherein the authentication token is a QR code or other visual code which can be captured.

17. The method of claim 1, wherein the generated review-in-progress is configured to be completed by the user at a later time.

18. The method of claim 1, further comprising: In response to receiving the completed review from the user, providing a reward to the user.

19. The method of claim 1, wherein the completed review comprises a quantitative rating or ranking of the provider by the user.

20. A non-transitory computer-readable medium containing instructions for providing review content which is verifiable in a public blockchain network, comprising: instructions for receiving an identity verification for a user of a review engine; instructions for assigning a unique pseudonymous identity to the user based on the identity verification, wherein the unique pseudonymous identity is associated to the identity verification and is unique to the user; instructions for receiving an identity verification for a provider on the review engine; instructions for generating an authentication token unique to the provider to be displayed on a user client device associated with the user of the review engine, the authentication token indicating an interaction by the user with a product or a service of the provider; in response to the user capturing the authentication token via the user client device, instructions for generating a review-in-progress to be displayed on the user client device; instructions for receiving a completed review from the user client device; instructions for recording hashed data associated with the completed review into a transaction record on a public blockchain network, such that the transaction record can be publicly audited on the public blockchain network, the hashed data including the pseudonymous identity and a verified identity of the provider.

\* \* \* \* \*